Dec. 24, 1935.    R. B. JACKSON ET AL    2,025,243
METHOD AND APPARATUS FOR PREVENTING ACCUMULATION OF FOREIGN MATTER
IN OR ON BEER HANDLING EQUIPMENT AND FOR TREATING BEER
Filed Oct. 12, 1934

INVENTORS.
Robert B. Jackson.
John M. Lieb.
BY
ATTORNEYS.

Patented Dec. 24, 1935

2,025,243

UNITED STATES PATENT OFFICE 2,025,243

METHOD AND APPARATUS FOR PREVENTING ACCUMULATION OF FOREIGN MATTER IN OR ON BEER HANDLING EQUIPMENT AND FOR TREATING BEER

Robert B. Jackson and John M. Lieb, Columbus, Ohio

Application October 12, 1934, Serial No. 748,104

5 Claims. (Cl. 204—26)

Our invention relates to a method and apparatus for preventing accumulation of foreign matter in or on beer handling equipment and for treating beer. It has to do more particularly with electrical means for preventing yeast growth and the accumulation of other foreign matter on or in tubes, pipes and metal containers used in the manufacture and dispensing of beer. One aspect of the invention also deals with electrical treatment of the beer for restoring its life and for improving its taste.

In the past, it has been very difficult to keep beer-handling equipment free from yeast growth and other foreign matter. For example, in beer-dispensing apparatus, the beer is usually passed through a cooling coil made of metal. In time, a foreign yeast growth will accumulate in the coil and will ultimately become so heavy that the beer flowing through the coil breaks it off and it is dispensed into the beer glass where it can be readily seen and is unappetizing to the drinker. This growth in the coil also gives a bad taste to the beer.

The prevailing custom is to clean the coil once a week by steam or by the use of a cleaning solution. This method for keeping the coil in condition is fairly successful, but it is expensive, not only from the labor standpoint, but from the standpoint of the wastage due to loss of beer when the coil is emptied in preparation for cleaning. Also, after the coil is cleaned, a considerable amount of the first beer to pass through the coil is generally cloudy and not fit for use.

In order to keep beer in proper condition, it must be kept cool from the time it is manufactured to the time it is dispensed. This means that beer-serving establishments must have refrigerated rooms where the barrels can be placed before they are tapped and means for keeping the beer in the barrels cool after they are tapped. Many such establishments do not have these facilities and the barrels or kegs are not kept cool. The beer that is dispensed is cooled from running through the cooling coil, but the beer in the keg itself is usually at room temperature. This causes the beer to become "flat" and when it is dispensed it will foam in the glass but the foam will quickly disappear. The taste of the beer also changes and it seems to become more bitter and does not have the smooth taste that beer has which is kept cool at all times before it is dispensed.

One of the objects of our invention is to provide a method and apparatus for preventing formation of yeast growth or deposits of other foreign matter in or on beer-handling equipment.

Another object of our invention is to provide a method and apparatus for treating beer which will restore life to beer even after it has become "flat", and which will improve the taste of beer.

Another object of our invention is to provide a method and apparatus which is very effective for the purposes for which it is intended.

Another object of our invention is to provide apparatus for the purposes indicated which is of a very simple nature and can be manufactured and sold cheaply.

In its preferred form, our invention contemplates the use of electric means for preventing the accumulation of yeast growth and other foreign deposits on beer-handling equipment. This is preferably accomplished by passing an electric current through the tube, coil or other metallic surface with which the beer contacts. We also contemplate passing an electric current through the beer itself, which will rejuvenate the beer and will improve its taste.

The preferred embodiment of our invention is illustrated in the accompanying drawing wherein similar characters of reference designate corresponding parts and wherein.

Figure 1:
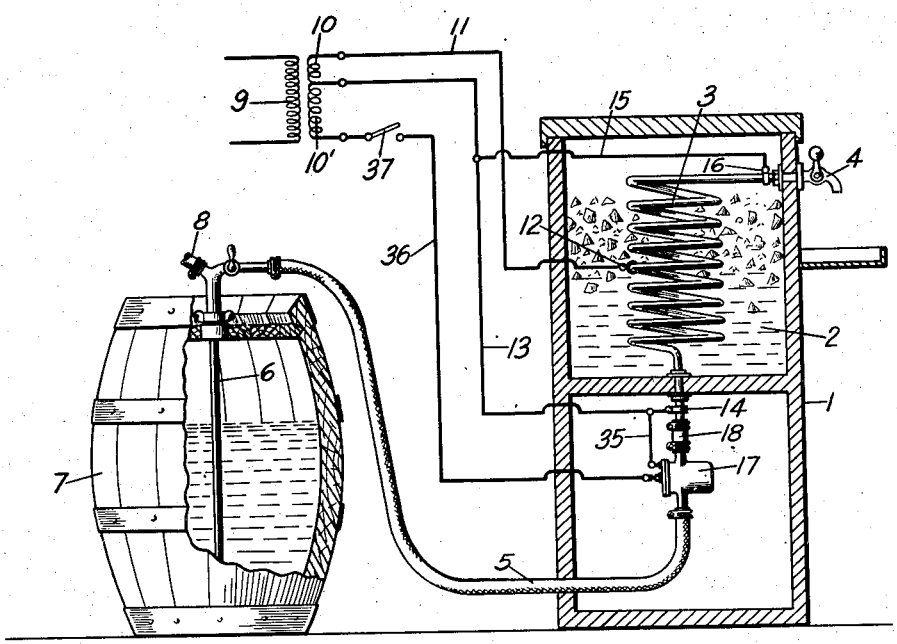
Figure 1 is a view, more or less diagrammatic, illustrating beer-dispensing apparatus with an electrical system applied thereto in accordance with the principles of our invention.

With reference to the drawing, and particularly to Figure 1 we have illustrated beer-dispensing apparatus to which our invention is applied. However, it will be apparent that our invention is applicable to other beer-handling apparatus such as that used in breweries.

The beer-dispensing apparatus illustrated in Figure 1 comprises a cabinet 1 which has a box 2 formed in the upper portion thereof. This box 2 is of water-proof construction and has a coil 3 of block tin or other suitable metal disposed therein. The beer is adapted to pass through this coil and to be cooled during its passage therethrough. The box is usually filled with cracked ice and enough water to submerge the coil so that the coil will be cooled.

A spigot 4 is provided for controlling flow of beer from the coil. The coil 3 is connected to a flexible hose 5, in a manner to be described subsequently, and this hose is connected to a tap rod 6 which is inserted in a keg 7. There is also a connection 8 on the tap rod through which a supply of carbon dioxide or air under pressure is connected so that the beer in the keg is always kept under pressure. This pressure forces the beer up through rod 6, through hose 5, and up through the coil 3 to the spigot 4.

As previously stated, in time, the coil, through which the beer passes so that it will be cooled, will acquire a growth of yeast or other foreign matter, if means is not provided for preventing this. To keep the inside of the tube, of which the coil 3 is composed, clean at all times and free from deposits of foreign matter, we preferably pass an electric current through the coil.

We have found that by passing an electric current through the coil, accumulation of the foreign yeast growth on the inside of the coil or accumulation of a deposit of other foreign matter will be effectively precluded. Although we are not positive as to the theory of what causes this phenomenon, we have found by actual test that this system will work effectively for preventing accumulation of foreign matter in the coil.

The theory of operation of such a system may be as follows, although we are not positive that this theory is accurate. In running current through the beer coil, the beer will naturally carry some of the current. This current will be conveyed to the beer from the inside surface of the coil which is also the surface that accumulates the foreign deposit. When the foreign material attaches itself to the surface, it creates resistance to the flow of current and causes a voltage drop. The voltage drop would possibly kill the organic material that makes up the coil scum. Another theory that might be advanced is that whenever current flows through the coil, hydrogen and oxygen are drawn to the surface of the coil in a nascent form which readily combines with insoluble material to form a soluble. When the material next to the coil becomes soluble, it will naturally loosen and flow on through with the beer in which it will be dissolved. However, regardless of the theory of operation, we have found by actual test that passing an electric current through the coil effectively prevents the accumulation of a yeast growth or other foreign material inside of the coil.

In Figure 1, we show one way in which the electric current may be passed through the coil. We preferably use a direct or alternating current of low voltage and of fairly high current value. For example, we have found that a current having a voltage of one-half volt and a current strength of 8 amperes, works very satisfactorily.

For passing the electric current through the coil 3, a circuit like that illustrated in Figure 1 is preferably provided. The current source for this circuit is a transformer 9 which has one primary winding and two secondary windings so that it may be used for supplying current to two circuits each of which requires a different voltage and a different current strength from the other.

The circuit for passing the current through the coil 3 is connected to the secondary winding 10 of the transformer which will supply a current of lower voltage than the secondary winding 10' of the transformer. One line 11 of the circuit leads from one side of the secondary winding 10 to the middle of the coil 3 and is electrically connected to the coil at this point by a suitable clamp 12. The other side of the secondary winding 10 has a line 13 leading therefrom which has its opposite end electrically connected to the lower end of the coil 3, which extends from the bottom of the box 2, by means of a suitable clamp 14. Another line 15 leads from the line 13 and has its opposite end electrically connected to the upper end of the coil 3 by means of a clamp 16 of a suitable type.

It will be apparent that the circuit for supplying current to the coil 3 will be through wire 11, through the coil itself downwardly to wire 13, through this wire to the transformer. Also, the circuit will extend from wire 11 up through the coil, through wire 15 and then through wire 13 to the transformer. It is possible merely to connect one side of the circuit to the upper end of the coil 3 and the other side of the circuit to the lower end thereof. However, connecting the coil into the circuit as illustrated in the drawing is advantageous especially where the box 12 is composed of metal, in order to prevent shunting of the current through the wall of the box from the point where the spigot passes therethrough to the point where the lower end of the coil passes therethrough. In this instance, the source of current will supply alternating current. However, direct current may be employed.

We have found that this current, applied in the manner indicated, effectively prevents accumulation of foreign matter in the beer coil. The current will have no undesirable effect on the beer, but on the other hand, the current that flows through the beer will aid in restoring life to the beer and improve its taste. However, as will be described subsequently, we preferably provide other means for treating the beer to restore its life and to improve its taste.

As previously stated, if the beer is not kept properly, it will lose its life and become "flat" and its taste will be injured. In order to restore life to the beer and to improve its taste, we provide means for passing an electric current through the beer itself.

We have found that if an electrode is placed in the beer stream and a direct or alternating current is applied to this electrode, the beer will become energized, even after once becoming "flat", and will foam up in the glass the same as fresh beer. We have found that a current having a high voltage and low current strength will work very satisfactorily for this purpose. For example, it is desirable to use a current strength of .05 amperes at 20 volts.

The theory of operation of this part of our invention is even more difficult to determine. It seems that in exciting the beer with a current, it is ionized and the molecules thereof are attracted to each other which, in turn, causes the foam to stand up on the top of the beer for a longer period of time. This same ionization affects the taste of the beer probably because the nerves in the mouth are more or less an electrical phenomenon and are affected by the ionized beer. However, regardless of the accuracy of this theory, we have found in actual practice that this system will restore life to the beer and will improve its taste.

The manner in which this current can be passed through the beer is illustrated in Figure 1. The lower end of the coil 3 is connected to an electrode housing 17 by means of a short length of rubber hose 18. The end of this hose fits over an outlet tube 19 formed as a part of the housing. The end of the rubber hose 5 fits on the inlet tube 20 of the housing 17. The beer will flow through this housing 17 before it reaches the coil 3.

The housing 17 is of substantially cylindrical form having one of its ends closed by a removable head 21. The housing and head are of suitable metal. The head 21 may be removably held in place by a plurality of screws 22. A gasket 23 is provided for making a liquid-tight joint.

Figure 2:
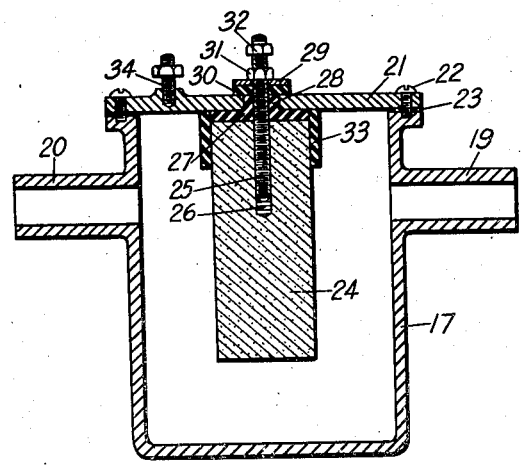
Figure 2 is a section through the housing for an electrode which is used for passing current through the beer.

An electrode 24 is mounted within the chamber 17 in the manner illustrated in Figure 2. This electrode is preferably made of graphite. Graphite is more suitable than steel or iron because it does not polarize or corrode. We have also found that carbon is suitable for this purpose. Although steel and iron are not as suitable, they may be used for the electrode if desired.

The electrode is preferably of cylindrical form but is of much less diameter than the housing 17 so that the beer may readily flow through the housing and around the electrode. It is held centrally within the housing by means of a stud 25 which is threaded into a socket 26 formed in one end of the electrode. This stud passes through a central opening in the cap 21. The end of the electrode is insulated from the cap 21 by an insulating member 27 disposed therebetween. This member 27 has an extension 28 which insulates the stud from the edge of the opening in the cap through which it passes. A metallic washer 29 is disposed on the stud 25 outside of the housing and an insulating washer 30 is provided between washer 29 and the cap. A nut 31 is threaded onto the outer end of the stud and can be adjusted to firmly hold the electrode in position, to compress the insulating member 27 between the end of electrode 24 and to compress the insulating washer 30 between washer 29 and the cap 21. It will be apparent that with this structure, the electrode may be easily replaced when desired. A nut 32 is provided for connecting a wire to the stud and, consequently, the electrode.

We provide a flexible insulating tape or rubber band 3 around the end of the electrode 24. The insulating member 27 together with this insulating band 33, stop the flow of current to the stud 25 so that it will not be eaten away or corroded until the electrode 24 has been eaten away almost completely. The insulating member 27 also prevents liquid from passing between the electrode and the cap 21, thus preventing corrosion of the stud 25.

A terminal 34 is provided by which a second wire may be connected to the cap 21.

The source of current for this circuit will be the secondary winding 10′ of the transformer 9. A wire 35 leads from wire 13, which is connected to one side of the secondary winding 10′, and has its opposite end connected to the terminal 34 on the cap 21. A second wire 36 leads from the other side of the secondary winding 10′ and is connected to the stud 25 of the electrode 24. It will be apparent that this circuit will be completed from the secondary winding 10′, through wires 13 and 35, through cap 21, the beer itself, through electrode 24, stud 25 and through wire 36 to the opposite side of the secondary winding 10′.

Thus, the beer will be charged with a current of electricity. This will restore life to the beer and will also improve its taste. This will not only improve the taste of the beer and restore life to it, but will also aid the other system in keeping the coils 3 clean. The current will flow up into the beer in the coils and will aid in preventing accumulation of foreign matter in the coils.

If alternating current is used as indicated, the electrode 24 will not deteriorate to any great extent. If direct current is used, the electrode must be connected to the positive pole of the current source in order to prevent eating away of housing 17. It will attract oxygen and after being used for some time, it will be necessary to replace it. However, this can be readily done. The electrode housing will be of the same potential as the coil 3.

We have found that if the electrode is used for passing an electric current of high voltage and low current strength through the beer for two or three hours, without any beer being drawn, the beer will be broken down and its taste will be injured. However, if the beer is being drawn, this current will greatly improve its taste and other characteristics. Therefore, we provide a switch 37 in this circuit so that when beer is not dispensed for some time, the circuit to the electrode may be opened. This switch 37 is preferably located close to the spigot 4 and may even be operable by the spigot if desired. It may even be automatically operable from the pressure differential across an orifice in the beer piping.

Although it is desirable to break the circuit to the electrode, if beer is not dispensed from the apparatus for some time, the circuit which is used for passing the current through the coil 3, need never be broken. Even if this current passes through the coil constantly for several hours while the beer is not being drawn, it will have no injurious effect on the beer.

Although we have described the means for passing a current through the beer coil and the electrode means for energizing or treating the beer, as being used in combination with each other, it will be understood that only one of these devices may be used if desired.

From the above description, it will be seen that we have provided means for keeping the coil, through which the beer flows, clean at all times and free from yeast growth and other foreign matter. Also, we have provided means for improving the taste of beer and for improving other characteristics thereof.

Although we have described our invention as applicable to beer dispensing apparatus, we wish it to be understood that it may also be used in conjunction with other beer-handling apparatus such as is used in the breweries, where the problem of keeping the piping and equipment clean is of major importance. Also, this invention may be used in conjunction with apparatus for handling other beverages and for treating other beverages.

Having thus described our invention, what we claim is:

1. The method of treating beer or other beverages which comprises passing an electric current through a conduit through which the beer flows in order to prevent the accumulation of foreign matter on said conduit, and simultaneously passing an electric current through the beer itself to improve its taste and other characteristics.

2. In combination, beer dispensing apparatus including a coil through which the beer flows, means for preventing the accumulation of foreign matter on the inner surface of said coil, said means comprising an electric circuit for passing an electric current through said coil.

3. In combination with beer or other beverage handling conduit through which the beverage flows, means for preventing the accumulation of foreign matter in or on said conduit including means for passing an electric current through the conduit.

4. In a device for handling beer or similar beverages, a coil through which the beer flows, means for preventing the accumulation of foreign matter on the inner surface of said coil, a conduit through which the beer flows, means for improving the taste and other characteristics of the beer in said conduit, both of said means comprising an electric circuit for passing an electric current through said coil and the beer.

5. In combination with beer or other beverage handling conduit through which the beverage flows, means for preventing the accumulation of foreign matter in or on said conduit including means for passing an electric current through the conduit, said means comprising a hollow member for passage of the beer therethrough, an electrode disposed within said member in such manner that the beer in its passage therethrough is in contact therewith, a conduit in communication with said member for introducing beer from a source of supply into said member, a second conduit in communication with said member for discharging the beer therefrom, said electrode being connected to one side of an electric circuit and the opposite side of said circuit being connected to any of the aforesaid elements.

ROBERT B. JACKSON.
JOHN M. LIEB.